United States Patent [19]
Sourby et al.

[11] 3,940,998
[45] Mar. 2, 1976

[54] HOG PROCESSING METHOD

[75] Inventors: John C. Sourby, Mount Kisco, N.Y.;
Charles H. Wallace, Carrollton, Va.

[73] Assignee: International Telephone and Telegraph Corporation, Nutley, N.J.

[22] Filed: Oct. 16, 1974

[21] Appl. No.: 515,381

Related U.S. Application Data

[63] Continuation-in-part of Ser. No. 509,374, Sept. 26, 1974, abandoned.

[52] U.S. Cl................ 73/432 R; 17/52; 235/151.32; 235/151.33
[51] Int. Cl.²......................................... G01G 19/40
[58] Field of Search. 73/432 R; 235/151.32, 151.33; 17/52, 45, 54

[56] References Cited
UNITED STATES PATENTS

| | | |
|---|---|---|
| 2,727,391 | 12/1955 | Kolisch ............................ 73/432 R |
| 3,175,438 | 3/1965 | Johnson ......................... 235/151.33 |
| 3,237,664 | 3/1966 | Macy et al. |
| 3,319,053 | 5/1967 | Roberts .......................... 235/151.33 |
| 3,800,363 | 4/1974 | Lapeyre ................................. 17/52 |

*Primary Examiner*—S. Clement Swisher
*Attorney, Agent, or Firm*—John T. O'Halloran; Menotti J. Lombardi, Jr.

[57] ABSTRACT

A method and means for optimizing value obtainable from hog carcasses by utilizing particular hog measurements and current market values to determine cutting parameters. Ham and loin primal cuts from each carcass half are optimally produced in accordance with measurements made on the individual carcass from which the cuts are obtained.

13 Claims, 5 Drawing Figures

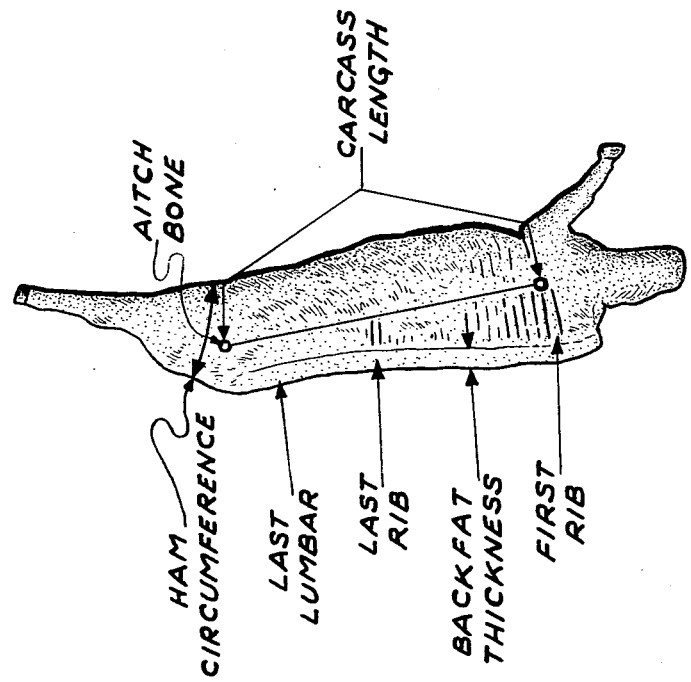
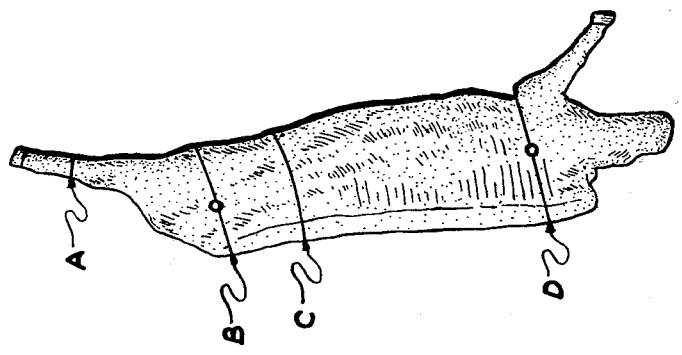

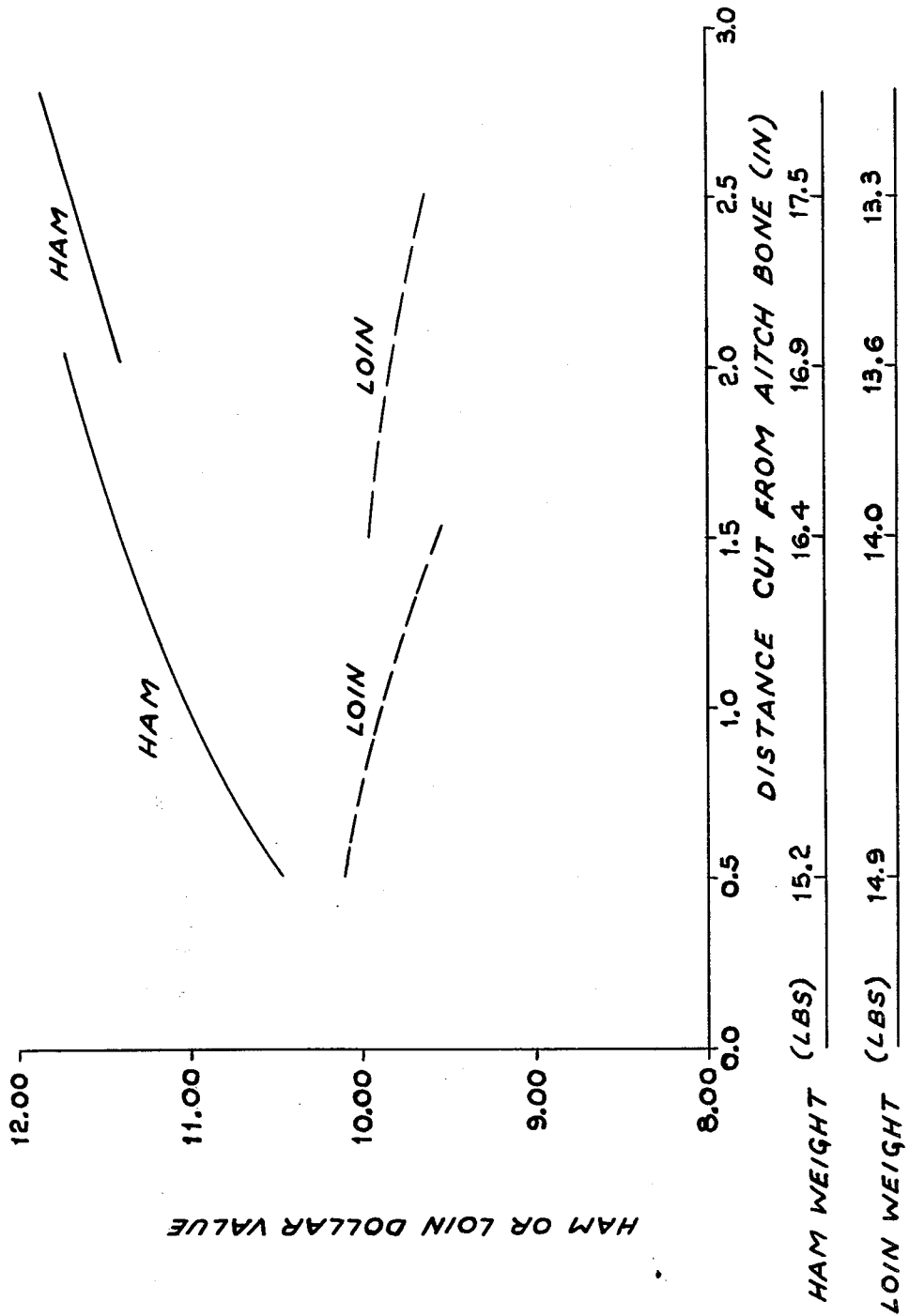

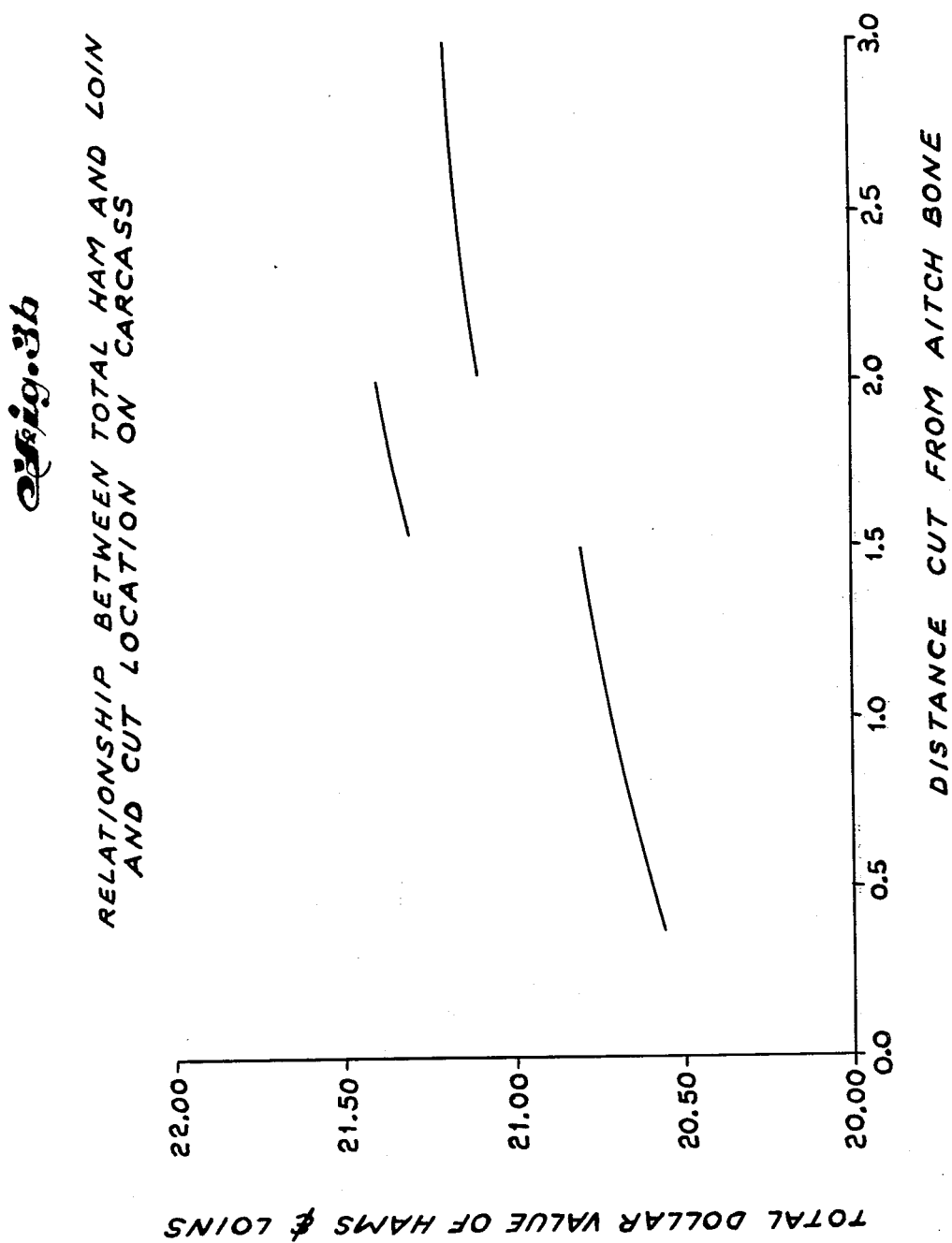

HOG PROCESSING METHOD

This application is a continuation-in-part of application Ser. No. 509,374, filed Sept. 26, 1974 now abandoned.

CROSS-REFERENCE TO RELATED APPLICATIONS

This application is related to application Ser. No. 455,168, filed Mar. 27, 1974, now abandoned, entitled "Method and Apparatus for Measuring Carcasses" and assigned to the same assignee as this application. Insofar as the cross-referenced application is necessary for an understanding of the instant application, it is incorporated herein by reference.

BACKGROUND OF THE INVENTION

In an effort to maximize the value of hog slaughtering in a processing plant, it appears we should not only think of hogs in groups or categories by weights or quality grades, but consider also each hog as an individual. We should analyze the various yield potentials of each hog according to the relative value of the various cuts based upon current market values, giving due consideration to market value of the various weight ranges of each primal cut and to the fact that yield potential of most of the cuts can be varied by the point of demarcation and still stay within customary trade practice. Where a primal cut is going to be reduced to a boneless cut, it is frequently possible to deviate beyond normal trade practice and improve values without inviting criticism from customers or the ultimate consumer.

The value of hog cuts must be calculated daily using current market values for each cut. The mark value of each cut is based on the cut weight. All cuts within a given weight range have the same market value. The desired weight of each of the primal cuts to produce maximum return for the current market is determined by establishing the exact points of demarcation between each primal cut on the individual carcass.

As an industry, we have applied the above technique to all hogs for a given market situation for an entire day's cut and this is where we lose a profit potential. It will be much easier to narrow our discussion to two primal cuts and amplify to all cuts later than to try to encompass all cuts at this point. Therefore, we will only consider hams and loins.

According to the previous methods on a given day when hams were selling substantially above loins, a standard well-run plant would issue instructions to cut all hams at least three fingers beyond the aitch bone on all hogs for that day's operation. Some plants would carry this to the extreme and specify the point of demarcation should be four fingers (approximately three inches) beyond the aitch bone. This practice would produce many hams and loins yielding less than the maximum profit potential.

For example, by cutting both sides of a carcass at a point 2.5 inches beyond the aitch bone, we could expect to produce two 18.00 lb. hams and two 12.50 lb. loins from a dressed carcass weighing 180 lbs., 32 inches long and 1.5 inches average backfat thickness.

In the market shown below, the value of the loins and hams would be computed as follows:

```
2 loins weighing 12.50 lbs. each (14.5 & down) at $0.435/lb.  =$10.88
2 hams weighing 18.00 lbs. each (17.5 - 20.5) at $0.395/lb.   =$14.22
                                                   Total      $25.10
```

| Ham and Loin Weight Class (Lbs.) | Market Value ($/lb.) Hams | Loins |
|---|---|---|
| Less than 14.5 | 0.4900 | 0.4350 |
| 14.5 – 17.5 | 0.4275 | 0.4100 |
| 17.5 – 20.5 | 0.3950 | 0.3550 |

Although it may not be obvious, in this market this hog was not cut in a manner to produce the most revenue. From our development, we know that the cut on the hams should have been 1.7 inch beyond aitch bone instead of 2.5 inch. We would produce the following cuts:

```
2 loins weighing 13.00 lbs. each (14.5 & down) at $.435/lb.   =$11.31
2 hams weighing 17.25 lbs. each (14.5 - 17.5) at $.4275/lb.   =$14.75
                                                   Total      $26.06
```

By cutting this one hog at 1.7 inches rather than 2.5 inches from the aitch bone, we increased our revenue from $25.10 to $26.06 or $0.96.

Accordingly, a technique has been developed for increasing the revenue obtained from hams and loins. This technique is based on the proposition that particular measurements made on individual hog carcasses can be utilized for predicting the cutting locations yielding meat and carcass parts having a maximum value. This technique is not restricted to maximizing only the value of the ham and loin cuts, since the concept applies to other cuts of fresh pork or other meat products, such as picnics, bellies, butts, etc.

SUMMARY OF THE INVENTION

An object of the invention is to provide a method and means for optimizing the value of carcass parts (picnics, hams, etc.) from a hog carcass utilizing particular carcass measurements.

Another object of the invention is to provide a relationship between particular carcass measurements and variable market values.

A further object is to determine the maximum possible value of ham and loin primal cuts which can be produced from a given carcass.

BRIEF DESCRIPTION OF THE DRAWINGS

The foregoing and other objects and features of the invention will best be understood if reference is made to the following description in connection with the drawings, in which:

FIG. 1 illustrates a typical half carcass and indicates how the ham and loin cuts can vary;

FIG. 2 illustrates a typical half carcass and some particular measurements to be made;

FIG. 3a shows graph evaluations of a ham and a loin cut from a given carcass for a given market;

FIG. 3b shows graph evaluations of the combined value of the ham and loin cuts from a given carcass for a given market.

DESCRIPTION OF THE PREFERRED EMBODIMENTS

Figure 4:
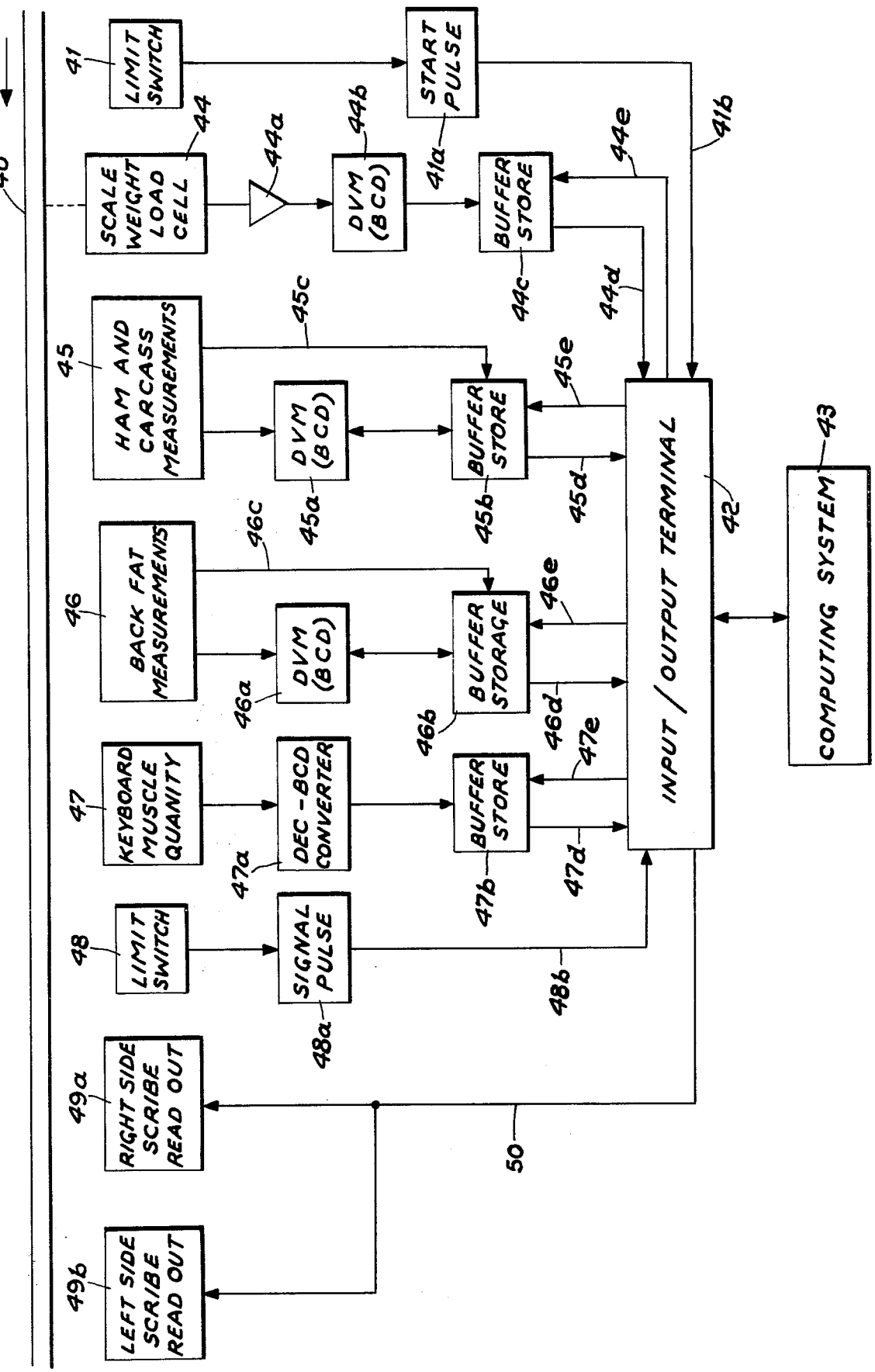
FIG. 4 shows a means for implementing the method of the invention.

Hog fabrication is the term applied to the process of cutting hog carcasses into parts that are sold at the wholesale level. The parts are cut from all hog carcasses in nearly an identical manner. The variation in the characteristics of individual hog characteristics is not normally taken into account prior to butchering; therefore, it is entirely possible to cut a hog carcass into parts yielding less than the maximum value.

In the novel method of the invention, hog parts having the maximum value can be produced if the variation in hog carcass characteristics was taken into account prior to butchering. In a given market situation, the value of a cut varies with its size, and a particular size cut is quite often more valuable than any other size being sold. The method provides that each hog carcass is cut in such a way to produce the parts having the greatest demand (or value) in the market place.

The value of the ham and loins depends on the market conditions. The structure of the market follows.

| Weight Class | Price/Lb. Hams/Loins | |
|---|---|---|
| less than 14.5 lbs. | $A_1$ | $A_2$ |
| 14.5 – 17.5 lbs. | $B_1$ | $B_2$ |
| 17.5 – 20.5 lbs. | $C_1$ | $C_2$ |
| 20.5 – 23.5 lbs. | $D_1$ | $D_2$ |
| 23.5 lbs. + | $E_1$ | $E_2$ |

Generally speaking, the smaller hams and loins command a higher price per pound. However, in any classification (wt), the hams may be worth less, the same, or greater than loins. The object is to cut the carcass in such a manner that both the hams and loins so produced fall into the classifications producing the maximum revenue. The potential combinations available depend on a given hog; therefore, an accurate assessment is required.

The amount of ham and loin that can be cut from a cacass side varies. The ham and loin weight may vary by as much as ±15%, depending how the carcass side is cut.

Referring now to FIG. 1, a carcass side is shown given the following relationships:

Minimum Ham = $A\text{-}B$
Maximum Ham = $A\text{-}C$
Minimum Loin = $C\text{-}D$
Maximum Loin = $B\text{-}D$
Ham or Loin = $B\text{-}C$ depending on where the carcass is cut.

In order to maximize the value of the ham and loin parts, the relevant variables for predicting the weight of hams and loins that could be cut from a carcass half must be identified, and based on the relevant variables and current market values, the exact cutting position on a carcass for producing hams and loins having the maximum value must be rapidly identified utilizing a mathematical model or algorithm.

The variables effecting the size and thus the value of the hams and loins were identified from measurements collected on about 120 hog carcasses. Multiple regression analysis was used for the identification of the most important variables that were evaluated.

The regression analysis revealed that several variables are required for predicting the amount of loin and ham in a carcass half, i.e. ham/loin weight = f (carcass weight, ham circumference, three backfat measurement, muscle quantity). Separate regression equations were generated for predicting the amount of ham and the amount of loin in each carcass half. The maximum of the ham and loin combination produced by cutting between B and C is determined by an algorithm based on the above functions. The functions (equations) are as follows:

$X_h$ (Ham weight) $= K_h + h_1 X_1 + h_2 X_2 + h_3 X_3 + h_4 X_4 + h_5 X_5 + h X_6 + h_7 X_7 + h_8 X_8 + h_{88}(X_8)^2 + h_9 X_9 + h_{99}(X_9)^2$.

$X_L$ (Loin weight) $= K_L + L_1 X_1 + l_2 X_2 + L_3 X_3 + L_4 X_4 + L_5 X_5 + L_6 X_6 + L_7 X_7 + L_8 X_8 + L_{88}(X_8)^2 + L_9 X_9 + L_{99}(X_9)^2$.

Typical equations for predicting the weight of hams and loins from individual carcasses are presented in Table I. In this Table, the measured variables required for predicting the weight of the ham and loin are shown in FIG. 2. The regression coefficients associated with each variable are listed in Table I. The ham and loin coefficients may change under varying operating conditions. This technique is not restricted to the coefficients listed below.

TABLE I

| Variables | | Predicting Equations Ham ($h_n$) Coefficients | Loin ($L_n$) Coefficients |
|---|---|---|---|
| Carcass Side* | $X_1$ | 0.063 | 0.433 |
| Whole Carcass Weight (lb.) | $X_2$ | 0.042 | 0.057 |
| Carcass Length (in.) | $X_3$ | 0.024 | 0.252 |
| Backfat Thickness (in.) | | | |
|   At First Rib | $X_4$ | −0.297 | −0.339 |
|   At Last Rib | $X_5$ | −0.261 | 1.01 |
|   At Last Lumbar | $X_6$ | −0.888 | −1.46 |
| Muscle Quantity* | $X_7$ | −0.177 | −0.050 |
| Ham Circumference (in.) | | | |
|   Linear Term | $X_8$ | −0.612 | 0.373 |
|   Quadratic Term | $X_8^2$ | 0.028 | −0.004 |
| Cutting Distance (in.)* | | | |
|   Linear Term | $X_9$ | 1.43 | −1.09 |
|   Quadratic Term | $X_9^2$ | −0.10 | +0.102 |
| Constant | $K$ | 6.395 | −8.74 |
| Ham or Loin Weight | $X$ | — | — |

*Explanation of variables:
Carcass Side: right side = 1, left side = 0
Muscle Quantity: based on a 6 point scale; 1 = excellent, 6 = poor
Cutting Distance: linear measurement from aitch bone From Table I, the following observations should be made:

1. The sign of each linear regression coefficient. A negative sign means that increasing the magnitude of the variable will decrease the weight of the ham and loin, and conversely, a positive sign means that the weight of the ham and loin will increase as the magnitude of the variable increases. These coefficients show that the amount of ham or loin in a carcass decreases with backfat thickness and muscle quantity scores and increases with carcass weight and length (high muscle quantity scores are indicative of poor muscle quantity).

2. The cutting distance from the aitch bone, and the ham circumference terms are not linear. The non-linear terms show that the weight of the ham and loin cut from a carcass half is not linearly proportional to the magnitude of the measurement.

3. The length of the carcass and the identification of the left or right side are more important for predicting the loins than hams. The identification of the side for predicting loins is more important than for predicting hams because approximately 1/2 pound more loin was found on the right side. This difference may have been due to a cutting bias introduced by the main splitting the carcass in two. The difference between the left and right hams is on the average less than an eighth of a pound.

The complex structure of the ham and loin market can be represented, for example, as a discontinuous function as shown in graphs of FIGS. 3a and 3b which represent evaluations of a given hog for a given market and classification. There are several weight classifications, and the value of the cuts change abruptly from one classification to the next. Solutions to equations can be obtained rapidly by a computer or calculator tie-in as indicated in FIG. 4.

The model for maximizing the value of the ham and loin cut from each hog carcass is based on the two regression equations as discussed. Only these two equations are used for predicting the weight of the ham and loin. The size of any ham or loin is expressed as a function of the cutting distance from the aitch bone. All other measurements for a given carcass are fixed and cannot vary. As the cutting distance from the aitch bone varies, hams and loins of varying sizes can be predicted for any cutting location. The value of each ham and loin combination is computed from current market values. The maximum value of the function corresponds to the cutting location producing a ham and loin having the greater dollar value.

The model takes into account the trimming losses associated with the preparation of hams and loins. Less fat is removed from a ham than a loin, and as a result, the total weight of all possible ham and loin combinations available in a carcass is not constant. The total weight of the ham and loin combination varies with the cutting position from the aitch bone. A large ham and small loin will weigh approximately 3/4 of a pound more than a small ham and large loin cut from the same carcass. The trimming losses associated with the preparation of hams and loins were built into the relationships existing among the variables when generating the original data. At this time, the amount of trimming obtained at each cutting location was distributed between the ham and loin in a ratio normally found at a given cutting location.

To produce the optimum size ham and loin for each carcass, a rapid means is required for estimating first the potential ham and loin available in a particular carcass from the measured characteristics and then integrating this information with the current ham and loin market value. The decision regarding how a carcass should be cut must be made before the cut is made, otherwise ham and loins having the maximum value cannot be produced. Once the cut is made between the Section B–C of FIG. 1, i.e. a predetermined amount of inches from the aitch bone, The size of the ham and loin is determined.

Referring now to FIG. 4 which is related to normal processing in a packer plant, the carcasses, whole carcasses and/or carcass halves, are moved on a conveyor arrangement 40 by their hind legs in the direction of arrow 40a in a continuous manner and at an approximate rate of 400 to 500 carcasses an hour. In order to make a measurement on each carcass, it is necessary to have the means available for rapidly making the measurements of length, circumference, and thickness, and then recording these measurements. The solutions to the foregoing equations are easily obtained by a computer or calculator tie-in as indicated in FIG. 4.

As a whole carcass or carcass half is moved along the conveying line 40, a first limit switch 41 is tripped causing a start pulse to be generated by means 41a and to be coupled by means 41b to the input/output terminal 42 for coupling to the computing system. As the carcass moves along to a second position, it engages a scale weight load cell 44 which through amplifier driver 45a, produces a proportional output voltage to a digital volt meter 44b which produces a BCD coded output which is coupled and stored in the buffer store 44c. The output from the buffer store is coupled by line 44d to the input/output terminal in accordance with a strobe or timing pulse 44e from the computing system. The output of the scale load cell is proportional to the weight in pounds of the carcass and the value stored in buffer store 44c represents the carcass weight in pounds, variable $X_2$ in the ham and loin predicting equations.

The carcass coontinues along the conveying system 40 to means 45 where the ham and carcass length measurements are made utilizing a measuring tool in accordance with the cross-referenced application. The length measurements are coupled to a digital volt meter 45a whose BCD coded output is coupled to a buffer store 45b which retains the ham circumference measurement and the carcass length measurement. The measuring tools by line 46c cause the storing of the measurements as described in the cross-referenced application. The measurements are then fed by means 45d in response to a timing or strobe signal 45e to the input/output terminal device. The ham circumference measurement represents the variable $X_8$ in the predicting equations and the carcass length measurement represents variable $X_3$ in the predicting equations. The carcass continues along the conveying system to means 46 where fatback measurements are made. These measurements represents the fatback thickness at the first rib or variable $X_4$, at the last rib or variable $X_5$, and at the last lumbar or variable $X_6$. The fatback measurements are made utilizing a tool as described in the cross-referenced application and the output of the tool for the three measurements is coupled to a digital volt meter 46a whose BCD output is coupled to the buffer store 46b, wherein each of the three signals is retained in a store in accordance with an indication 46c of the measuring tool. The three outputs from the store 46b are coupled by lines 46d to the input/output terminal in accordance with strobe pulse 46e.

As the carcass continues along the conveying rail 40, an operator by keyboard means 47 containing at least a six decimal scale indicates the muscle quantity in accordance with variable $X_7$ in the predicting equations, the decimal output being coupled to a decimal to BCD converter 47a whose output is fed to store 47b. The muscle quantity output from the store 47b is coupled by line 47d to the input/output terminal 42 in accordance with strobe pulse 47e. As limit switch 48 is tripped, a signal pulse is generated in means 48a and coupled by line 48b to the input/output terminal. The computing system is then able to solve the equations utilizing the measurements by varying the linear term $X_9$ from 0.5 to 3 inches for a given market condition. The computer output is coupled to a right side scribe readout means 49a and a left side scribe readout means 49b over line 50 for the particular carcass passing the measuring station of FIG. 4. The cutting distance in inches is indicated in readout means 49a and 49b as measured from the aitch bone, i.e., the cutting distance as measured from B to C of FIG. 1. Once this scribe is marked on the carcass side, the size of the ham or loin weight for the carcass side is fixed. A simple means for scribing the distance for the cutter would be to use a tool similar to a compass in which the fixed point is placed on the aitch bone and a knife-edge scribe mark is made at the distance according to the inches shown on the display 49a and 49b.

It should also be also understood that the necessary power supply source is coupled in the system by means of the input/output terminals or directly to the elements described. It should further be understood that this is one means of implementing the method of ham and loin predicting according to the predicting equation utilizing predetermined cutting parameters which have been measured for each whole carcass and producing for each carcass half an output indicating the maximum return for ham and loin primal cuts for the particular carcass measured.

The following examples indicate a typical evaluation using the method and means of the invention.

EXAMPLE I

A whole carcass weighing 149 lbs., having a length of 30.5 inches backfat measurements of 1.14, 1.70, and 1.10 inches for the first rib, last rib and last lumbar, a ham (thigh) circumference of 25.15 inches, and a muscle quantity of 2 was divided into two sides. The left side was cut according to a standard method (cut of 1.57 inches beyond the aitch) and the right side was cut according to the method described according to the invention. The following results were obtained:

|  | Standard Cut (left side) | Invention Method Cut (right side) |
|---|---|---|
| Cutting location (inches from aitch) | 1.57 | 2.75 |
| Ham: | | |
| Weight (lbs.) | 15.57 at 0.655/lb. | 17.38 at 0.655/lb. |
| Value ($) | 10.20 | 11.38 |
| Loin: | | |
| Weight (lbs.) | 12.50 at 0.685 /lb. | 11.50 at 0.685/lb. |
| Value ($) | 8.56 | 7.87 |
| Total Value ($) | 18.76 | 19.25 |

Increase: $0.49/side (19.25−18.76) or 0.98/hog.

EXAMPLE II

The accuracy of predicting the size of the ham and loin from the regression equations was assessed by measuring the carcass prior to butchering and weighing the parts after butchering, and then comparing the actual with the predicted ham and loin weights:

Carcass Variable Parameters:

| Weight | 145 lbs. |
|---|---|
| Length | 31.2 inches |
| Backfat thickness (inches) | |
| First Rib | 2.9 |
| Last Rib | 1.9 |
| Last Lumbar | 2.1 |
| Muscle quantity | 5 |
| Ham circumference | 26.1 |

| Parts | Weight of Parts (Lbs.) Predicted | Actual | Predicting Error |
|---|---|---|---|
| Ham | 15.66 | 15.30 | 0.36 |
| Loin | 14.31 | 14.40 | 0.09 |

EXAMPLE III

The variation in the value of hams and loins when cut at several locations on one carcass side is presented in the following table. This table shows that the maximum revenue for this carcass is achieved by cutting the side at 2 inches beyond the aitch bone.

| Cutting Location (beyond aitch bone) | Weight | | Value | | |
|---|---|---|---|---|---|
| | Ham | Loin | Ham | Loin | TOTAL |
| 0.50 | 15.59 | 14.58 | 10.29 | 10.50 | 20.79 |
| 1.00 | 16.23 | 14.11 | 10.71 | 10.44 | 21.15 |
| 1.50 | 16.82 | 13.70 | 11.10 | 10.13 | 21.23 |
| 2.00 | 17.36 | 13.33 | 11.46 | 9.86 | 21.32 |
| 2.50 | 17.85 | 13.10 | 11.33 | 9.63 | 20.96 |

| Weight Class | Price/Lb. Ham | Loin |
|---|---|---|
| Less than 14.5 | .71 | .74 |
| 14.5 – 17.5 | .66 | .72 |
| 17.5 – 20.5 | .635 | .68 |
| 20.5 + | .600 | .59 |

A process for increasing the value of hams and loins cut from individual hog carcasses has been described. The process is based on the accuracy of predicting the carcass cutting position based on carcass measurements and current market values.

It should be understood that specific weight classifications and market values have been used; however, the weight classes and corresponding market values could be changed without affecting the validity of the method or the accuracy of its results. Identifying the critical parameters and making the individual measurements on each carcass is necessary in order to attain a maximized value of hams and loins. This invention should not be confined to using only those predicting parameters described herein.

While we have described above the principles of our invention in connection with specific apparatus, it is to be clearly understood that this description is made only by way of example and not as a limitation to the scope of our invention as set forth in the objects thereof and in the accompanying claims.

We claim:

1. A method of hog carcass measurements for determining ham and loin cuts during processing, comprising the steps of:
   weighing the carcass;
   measuring the ham circumference and carcass length;
   measuring the backfat thickness;
   indicating the muscle quantity; and
   utilizing the measurements to indicate the cutting point in relation to the aitch bone.

2. The method of claim 1, including the steps of measuring the backfat thickness at the first rib, the last rib and at the last lumbar.

3. The method of claim 2, including the steps of storing and coupling the measured values to a calculating means.

4. The method of claim 3, including indicating the cutting point for the measured carcass for optimized ham/loin cuts.

5. A method for hog processing for maximizing the value of ham and loin cuts for a given carcass and market condition, comprising:
   weighing the hog carcass;
   measuring the carcass length and ham circumference;
   measuring the backfat thickness at three predetermined locations;
   determining a muscle quantity for the carcass; and
   utilizing the weight and measurement results to effect an optimization ham and loin cut to be made per hog side.

6. The method of claim 5, including cutting the carcass side a predetermined distance from the aitch bone.

7. The method of claim 6, wherein said predetermined distance is 0.5 to 3.0 inches forward of the aitch bone.

8. A process for maximizing the value of ham and loin cuts from a carcass by incorporating particular carcass measurements in the determination of the cuts, the process including:
   storing a first signal representing the weight of the carcass to be cut;
   storing a second signal representing the ham circumference;
   storing a third signal representing the carcass length;
   storing a fourth signal representing the backfat thickness at the first rib;
   storing a fifth signal representing the backfat thickness at the last rib;
   storing a sixth signal representing the backfat thickness of the last lumbar;
   storing a seventh signal representing the muscle quantity; and
   utilizing said first through seventh signals to determine the optimum ham and loin cuts in the carcass.

9. The process of claim 8, including indicating the cutting distance forward of the aitch bone.

10. The process of claim 9, including indicating the cutting distance of ham and loin cuts in relation to the aitch bone for both the left and right carcass sides.

11. The process of claim 10, including indicating the start of the carcass measurements, and indicating the end of the carcass measurements.

12. The process of claim 10, including scribing a cut mark on the carcass side in accordance with the indicated distance.

13. A method for maximizing the value obtainable from a hog carcass side as a function of particular carcass measurements and primal ham and loin cut market values, the hog fabrication being dependent on measuring the carcass and making an initial cut between the ham and the loin according to the procedure, comprising:
   weighing a carcass;
   measuring the carcass length from the aitch bone to the first rib;
   measuring the ham circumference;
   making backfat thickness measurements at the first rib, the last rib, and the last number;
   evaluating the muscle quantity;
   calculating from the measurements and evaluation the potential ham and loin cuts; and
   indicating the cutting point between the ham and loin based on the distance from the aitch bone for the carcass side being processed.

* * * * *